US012106686B2

(12) United States Patent
Xie et al.

(10) Patent No.: US 12,106,686 B2
(45) Date of Patent: Oct. 1, 2024

(54) SIGNBOARD ASSEMBLY AND FULLY TRANSPARENT SOLAR LED LUMINOUS SIGNBOARD

(71) Applicant: Peter Tian, Richardson, TX (US)

(72) Inventors: Yiming Xie, Wuxi (CN); Peter Tian, Richardson, TX (US)

(73) Assignee: Peter Tian, Richardson, TX (US)

( * ) Notice: Subject to any disclaimer, the term of this patent is extended or adjusted under 35 U.S.C. 154(b) by 127 days.

(21) Appl. No.: 17/970,334

(22) Filed: Oct. 20, 2022

(65) Prior Publication Data

US 2024/0135841 A1 Apr. 25, 2024
US 2024/0233584 A9 Jul. 11, 2024

(51) Int. Cl.

| | |
|---|---|
| ***G09F 13/18*** | (2006.01) |
| ***F21S 9/03*** | (2006.01) |
| ***G09F 9/33*** | (2006.01) |
| *F21Y 115/10* | (2016.01) |

(52) U.S. Cl.
CPC ................ *G09F 9/33* (2013.01); *F21S 9/035* (2013.01); *F21Y 2115/10* (2016.08)

(58) Field of Classification Search
CPC .... G09F 9/33; G09F 13/0431; G09F 13/0472; G09F 13/049; G09F 13/18; G09F 27/007; G09F 2013/1804
See application file for complete search history.

(56) References Cited

U.S. PATENT DOCUMENTS 10,255,831 B1 * 4/2019 Buck .................... A47G 1/0638
2006/0080874 A1 * 4/2006 Eberwein ................ G09F 13/04 40/564
2006/0242867 A1 * 11/2006 Choi ........................ G09F 13/12 40/219
2008/0174456 A1 * 7/2008 Warren ............... G09F 15/0037 362/183
2009/0025264 A1 * 1/2009 Daimon .................. G09F 13/18 40/546
2017/0059748 A1 * 3/2017 Chan .................... G02B 5/0278
2019/0272779 A1 * 9/2019 Gamble ............... B60Q 1/2626

FOREIGN PATENT DOCUMENTS

EP 2103972 A1 * 9/2009 ........... B60R 13/005

* cited by examiner

*Primary Examiner* — Cassandra Davis
(74) *Attorney, Agent, or Firm* — Timothy T. Wang; Ni, Wang & Massand, PLLC

(57) ABSTRACT

The present disclosure discloses a signboard assembly and a fully transparent solar LED luminous signboard. The signboard assembly comprises: a U-shaped sealing ring, a patterned reflective film, a light-diffusing plate, a light-guiding plate, an LED light bar, a white reflective film, a back plate, a signboard bracket, and a control box. The full-transparent solar LED luminous signboard includes a solar power supply assembly and the signboard assembly as described above. The present invention adopts side light emitting principle, wherein light is guided through the light-guiding plate, is reflected by the reflective film, and is homogenized by the light-diffusing plate, so that the whole signboard is finally illuminated uniformly. The problem that the traffic sign is difficult to identify is solved.

9 Claims, 3 Drawing Sheets

SIGNBOARD ASSEMBLY AND FULLY TRANSPARENT SOLAR LED LUMINOUS SIGNBOARD

FIELD OF THE INVENTION

The present disclosure relates to a traffic signboard, in particular to a fully transparent solar LED luminous signboard.

BACKGROUND OF THE INVENTION

Road and traffic signs are graphic symbols that shows traffic regulations and road information. They can make traffic regulations vividly, concretely, and concisely expressed, and at the same time, they also express the contents that are difficult to describe in words, which are facilities for managing traffic and indicating driving directions to ensure unimpeded roads and driving safety. At present, the luminous signs for traffic management used on roads mainly include passive reflective signs and active luminous signs. The passive reflective signboards passively reflect light under the illumination of light sources, which can make the sign visually identified. The visual identification distance depends on the illumination brightness of the light source, while the traffic sign will not shine without the illumination of the light source. The active luminous signboard is characterized by arranging a light source in the sign body, the light source directionally projects light to the back surface of the sign panel, and the sign information content is displayed through a panel.

With passive reflective signboards, in extreme weather conditions, drivers must use high beam to see clearly the contents of traffic signboards. However, when the strong light from the high beam shines on the eyes of oncoming drivers or pedestrians, the glare will instantly make the eyes dark, and the reaction time and braking distance will be nearly doubled as usual. According to relevant data, 40% of traffic accidents are related to high beam. Although passive reflective signs have overcome the problem that they can't be seen at night, this kind of signs for traffic management still have some defects, such as small reflection angle, insufficient brightness, small identification distance and so on.

SUMMARY OF THE INVENTION

Aiming at the shortcomings existing in the prior art, the present disclosure provides a fully transparent solar LED luminous signboard, which is an improved active luminous signboard, and the LED light source is built into the traffic sign, thus realizing cold light source and surface light emission application, which can still be seen clearly in extreme weather or night, effectively reducing the driver's high beam utilization rate, and reducing the traffic accident rate caused by high beam. In addition, it can be powered by solar energy, and it is suitable to be deployed in areas lacking mains supply.

In a first aspect, the embodiment of the present disclosure provides a signboard assembly, which comprises a U-shaped sealing ring, a patterned reflective film, a light-diffusing plate, a light-guiding plate, an LED light bar, a white reflective film, a back plate, a signboard bracket, and a control box.

The light-guiding plate defines a groove at its periphery, and the LED light bar is embedded and installed in the groove at the periphery of the light-guiding plate. The light-guiding plate is a side-incident type light-guiding plate.

The patterned reflective film is bonded on the front surface of the light-diffusing plate by an adhesive backing. The light-diffusing plate, the light-guiding plate, the white reflective film, and the back plate are sequentially connected into an integral unit. The U-shaped sealing ring is disposed around the integral unit.

The signboard bracket and the control box are installed on the back surface of the backboard.

Further, the light-diffusing plate, the light-guiding plate, the white reflective film, and the back plate are fixedly connected through an aluminum foil tape at the periphery. Then, the U-shaped sealing ring is arranged around the light-diffusing plate, the light-guiding plate, the white reflective film, and the back plate which are connected into the integral unit.

Further, the back surface of the light-diffusing plate is sanded.

Furthermore, the LED light bar adopts an FPC flexible circuit board, and a patch LED is attached to the FPC flexible circuit board.

Further, the patterned reflective film can be full-transparent.

Secondly, the embodiment of the present disclosure also provides a fully transparent solar LED luminous signboard, which comprises a solar power supply assembly and the signboard assembly as described above.

The solar power supply assembly comprises a solar bracket, a solar panel, and a storage battery. The solar panel is connected to the solar bracket.

Further, the control box is connected to the LED light bar through wires, the solar panel is connected to the control box through wires, and the control box is connected to the storage battery through wires.

Further, the solar bracket is installed on a vertical post; the storage battery is installed on the solar bracket.

Further, the signboard bracket is installed on the vertical post through a hoop.

The present disclosure has the advantages that: the present disclosure adopts side light emitting principle, wherein light is guided through the light-guiding plate, is reflected by the reflective film, and is homogenized by the light-diffusing plate, so that the whole signboard is finally illuminated uniformly. Therefore, the problems that the driver cannot clearly identify the guide sign information due to the limitation of the reflection angle at night and that the traffic signs are difficult to identify by the drivers and pedestrians due to bad weather such as rain and snow are solved. Secondly, solar power supply can be used in any place, especially in remote areas lacking mains power supply.

DETAILED DESCRIPTION OF THE INVENTION

In order to make the purpose, technical scheme, and advantages of the present invention clearer, the present disclosure will be further explained in detail below with reference to the attached drawings and examples. It should be understood that the specific embodiments described here are only used to explain the present disclosure, not to limit the present disclosure.

Figure 1:
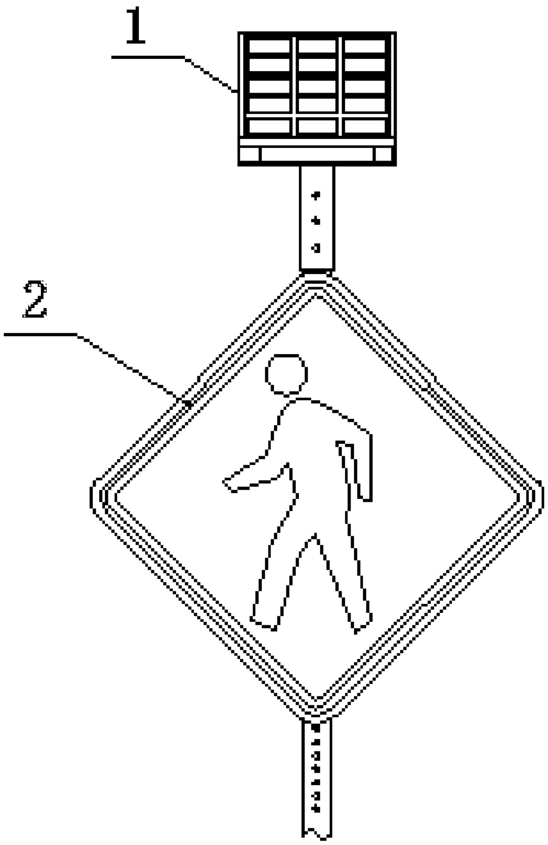
FIG. 1 is a schematic front view of an overall structure in an embodiment of the present disclosure.
Figure 2:
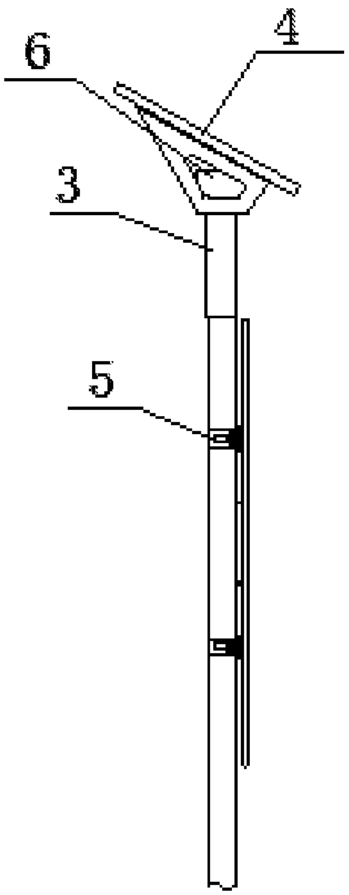
FIG. 2 is a schematic side view of the overall structure in the embodiment of the present disclosure.
Figure 3:
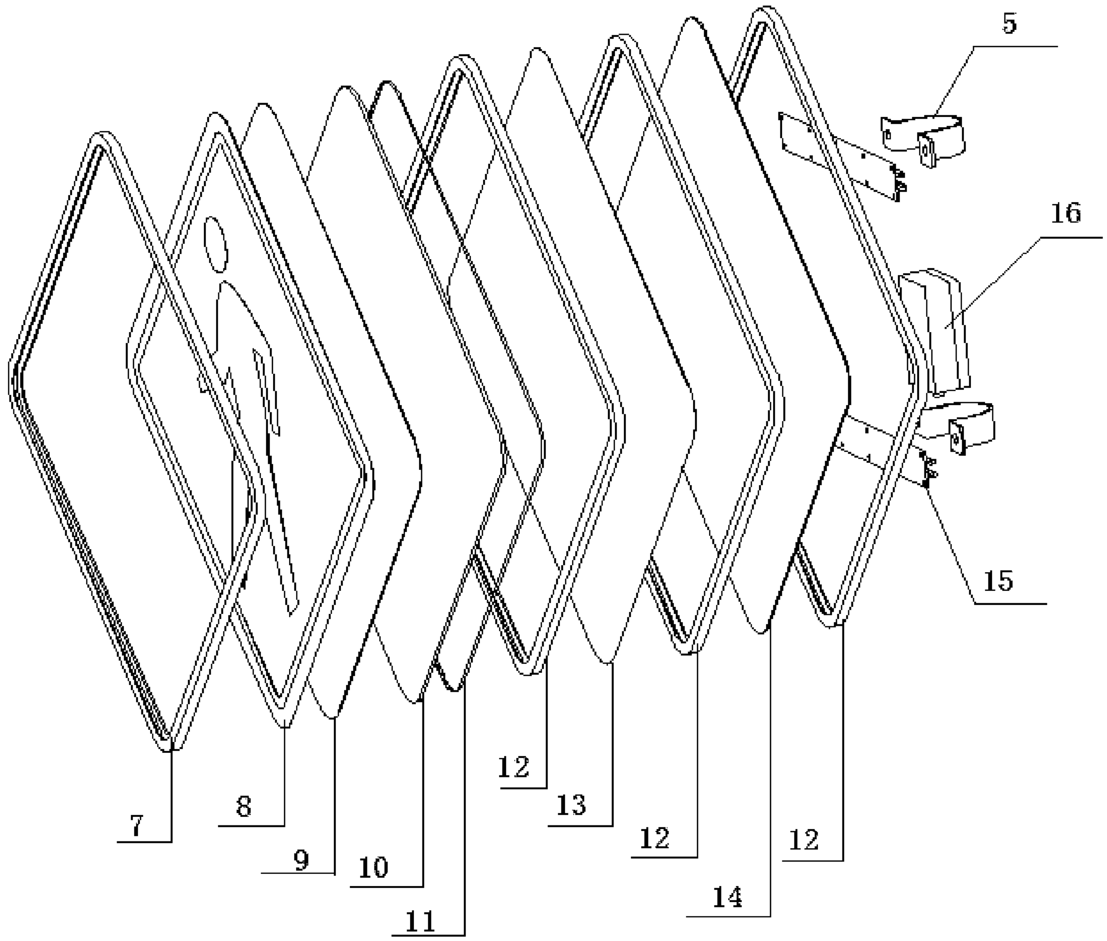
FIG. 3 is a schematic view of a signboard assembly in the embodiment of the present disclosure.

The embodiment of the present disclosure provides a fully transparent solar LED luminous signboard, which comprises a solar power supply assembly 1 and a signboard assembly 2, as shown in FIGS. 1 and 2.

The solar power supply assembly 1 includes a solar bracket 3, a solar panel 4 and a storage battery 6. The solar panel 4 is connected to the solar bracket 3, and the solar bracket 3 is installed on the vertical post; 6. The battery is installed on the vertical post.

The signboard assembly 2 includes a U-shaped sealing ring 7, a patterned reflective film 8, a light-diffusing plate 9, a light-guiding plate 10, an LED light bar 11, a white reflective film 13, a back plate 14, a signboard bracket 15 and a control box 16.

The light-guiding plate 10 defines a groove at its periphery, and the LED light bar 11 is embedded and installed in the groove at the periphery of the light-guiding plate 10. The light-guiding plate 10 is a side-incident type light-guiding plate. The LED light bar 11 installed at the side edge emits light. The light emitted from the LED and absorbed in an optical-grade acrylic plate stays on the surface of the optical-grade acrylic plate. When the light hits each light guide point, the reflected light will diffuse to various angles, and then the reflection conditions will be destroyed and the light exits from the front surface of the light-guiding plate. The whole light-guiding plate can emit light through various light guide points with different densities/sizes.

The LED light bar 11 adopts an FPC flexible circuit board, and a patch LED is attached to the FPC flexible circuit board. It can be cut arbitrarily or extended arbitrarily without affecting the light emitting. The FPC material is flexible and can be bent, folded, and wound arbitrarily.

The patterned reflective film 8 is bonded on the front surface of the light-diffusing plate 9 by an adhesive backing. The light-diffusing plate 9, the light-guiding plate 10, the white reflective film 13 and the back plate 14 are sequentially connected into an integral unit. A U-shaped sealing ring 7 is disposed around the integral unit. Specifically, the light-diffusing plate 9, the light-guiding plate 10, the white reflective film 13 and the back plate 14 are fixedly connected by a peripheral aluminum foil tape 12. First, the white reflective film 13 and the back plate 14 can be fixedly connected through the peripheral aluminum foil tape 12, then the light-guiding plate 10, the white reflective film 13 and the back plate 14 can be fixedly connected through the peripheral aluminum foil tape 12, and finally the light-diffusing plate 9 can be fixedly connected with the light-guiding plate 10, the white reflective film 13 and the back plate 14 through the peripheral aluminum foil tape 12. Finally, the U-shaped sealing ring 7 is disposed around the light-diffusing plate 9, the light-guiding plate 10, the white reflective film 13 and the back plate 14 which are connected into the integral unit. The U-shaped sealing ring 7 is used as an edge covering and has protective effect.

The light-diffusing plate 9 uses optical grade PMMA/PC and other plastics as base material, so that the light can be repeatedly refracted, reflected, and scattered between the chemical particles and the resin, thereby adjusting the light propagation direction, so that the light-diffusing plate product has high light transmittance and good light diffusion effect. The light-diffusing plate 9 has stable abrasion resistance, scratch resistance, and good ultraviolet resistance and weather resistance. The PMMA light-diffusing plate can be used for a long term below 80° C. The back surface of the light-diffusing plate 9 (that is, the surface facing the light-guiding plate 10) is sanded.

The patterned reflective film 8 can present a clear logo pattern. The patterned reflective film 8 is 3M ultra-strong patterned reflective film. Under the combined action of internal LED and optical assembly (light-diffusing plate, light-guiding plate, and white reflective film), the patterned reflective film 8 can realize full light transmission (signs, background areas, etc. are all light transmissive). When the patterned reflective film 8 is irradiated by external light, it can realize passive reflection to clearly show the logo pattern.

The white reflective film 13 can reflect the light exiting from the bottom surface of the light-guiding plate back into the light-guiding plate, to improve the use efficiency of the light. Under the condition of equal luminescence brightness per unit area, the luminous efficiency is higher and the power consumption is lower.

In the above structure, by using the light guide of the light-guiding plate, the reflection of the white reflective film and the homogenization of the light-diffusing plate, the signboard with uniform light emission can be finally obtained.

The signboard bracket 15 and the control box 16 are installed on the back surface of the back plate 14; Wherein the back plate 14 is made of aluminum; the sign bracket 15 can be installed on a vertical post through a hoop 5.

The control box 16 is connected to the LED light bar 11 through wires; the solar panel 4 is connected to the control box 16 through wires, and the control box 16 is connected to the storage battery 6 through wires. The control box 16 controls the LED light bar 11 to emit light, for example, be continuously on, flashing and the like. The control box 16 also controls the charging of the storage battery, and switches between the mains supply and the solar power supply. According to the requirements, the controller in the control box 16 can also has functions such as photosensitive control and time calibration with GPS. Accordingly, the control box 16 needs to be equipped with light sensors and GPS modules.

In a specific embodiment, the fully transparent solar LED luminous signboard proposed by the present disclosure can be used for various shapes of signboards, such as triangle, circle, square, hexagon, etc.

Finally, it should be noted that the above specific embodiments are only used to illustrate the technical scheme of the present disclosure, but not to limit it. Although the present disclosure has been described in detail with reference to examples, ordinary technicians in the field should understand that the technical scheme of the present disclosure can be modified or replaced equivalently without departing from the spirit and scope of the technical scheme of the present disclosure, which should be covered by the scope of the claims of the present disclosure.

What is claimed is:

1. A signboard assembly comprising:
a U-shaped sealing ring;
a patterned reflective film;
a light-diffusing plate;
a light-guiding plate;
an LED light bar;
a white reflective film;
a back plate;
a signboard bracket and a control box;
wherein the light-guiding plate defines a groove at its periphery, and the LED light bars is embedded and installed in the groove at the periphery of the light-guiding plate, and the light-guiding plate is a side incident type light-guiding plate;

wherein the patterned reflective film is bonded on the front surface of the light-diffusing plate by an adhesive backing, and the light-diffusing plate, the light-guiding plate, the white reflective film and the back plate are sequentially connected into an integral unit, and the U-shaped sealing ring is disposed around the integral unit; and wherein the signboard bracket and the control box are installed on a back surface of the back plate.

2. The signboard assembly of claim 1, wherein the light-diffusing plate, the light-guiding plate, the white reflective film and the back plate are connected through an aluminum foil tape;

Wherein the U-shaped sealing ring is disposed around the light-diffusing plate, the light-guiding plate, the white reflective film and the back plate which are connected into the integral unit.

3. The signboard assembly of claim 1, wherein a back surface of the light-diffusing plate is sanded.

4. The signboard assembly of claim 1, wherein the LED light bar adopts an FPC flexible circuit board, and further comprising a patch LED attached to the FPC flexible circuit board.

5. The signboard assembly of claim 1, wherein the patterned reflective film is fully transparent.

6. The signboard assembly of claim 1 further comprising:

a solar power supply assembly; and wherein the solar power supply assembly comprising:

a solar bracket;

a solar panel;

a storage battery; and wherein the solar panel is connected to the solar bracket.

7. The signboard assembly of claim 6, wherein the control box is connected to the LED light bar through wires;

wherein the solar panel is connected to the control box through wires; and wherein the control box is connected to the storage battery through wires.

8. The signboard assembly of claim 6, wherein, the solar bracket is installed on a vertical post through bolts and nuts; and wherein the storage battery is installed on the solar bracket through bolts and nuts.

9. The signboard assembly of claim 6, wherein the signboard bracket is installed on the vertical post through a hoop.

* * * * *